(12) United States Patent
Maeda et al.

(10) Patent No.: US 10,787,137 B2
(45) Date of Patent: Sep. 29, 2020

(54) STRUCTURAL MEMBER

(71) Applicant: Kobe Steel, Ltd., Hyogo (JP)

(72) Inventors: Yasuhiro Maeda, Kobe (JP); Toru Hashimura, Kobe (JP); Ryohei Yukishige, Kobe (JP); Akihiko Tatsumi, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 93 days.

(21) Appl. No.: 16/097,741

(22) PCT Filed: Apr. 20, 2017

(86) PCT No.: PCT/JP2017/015843
§ 371 (c)(1),
(2) Date: Oct. 30, 2018

(87) PCT Pub. No.: WO2017/199675
PCT Pub. Date: Nov. 23, 2017

(65) Prior Publication Data
US 2020/0139910 A1    May 7, 2020

(30) Foreign Application Priority Data

May 20, 2016 (JP) .................................. 2016-101663
Jan. 13, 2017 (JP) .................................. 2017-004495

(51) Int. Cl.
*B60R 19/18* (2006.01)
*B60R 19/04* (2006.01)
*B60R 19/03* (2006.01)

(52) U.S. Cl.
CPC .............. *B60R 19/18* (2013.01); *B60R 19/03* (2013.01); *B60R 19/04* (2013.01); *B60R 2019/182* (2013.01); *B60R 2019/1826* (2013.01)

(58) Field of Classification Search
CPC .......... B60R 19/18; B60R 19/03; B60R 19/04
(Continued)

(56) References Cited

U.S. PATENT DOCUMENTS 5,806,919 A * 9/1998 Davies ................. B62D 29/002
                                                      296/187.02
6,082,811 A   7/2000 Yoshida
(Continued)

FOREIGN PATENT DOCUMENTS

JP   H06-171441 A   6/1994
JP   H11-048780 A   2/1999
(Continued)

OTHER PUBLICATIONS

International Search Report issued in PCT/JP2017/015843; dated May 30, 2017.
(Continued)

*Primary Examiner* — Joseph D. Pape
(74) *Attorney, Agent, or Firm* — Studebaker & Brackett PC

(57) ABSTRACT

A structural member includes an inner member and an outer member formed of a material different from that of the inner member, the outer member being positioned outside the inner member so as to surround the inner member and including a first adjacent surface adjacent to an outer surface of the inner member, wherein an insulator is disposed between the first adjacent surface and a second adjacent surface of the inner member, the second adjacent surface being adjacent to the first adjacent surface.

9 Claims, 16 Drawing Sheets

(58) Field of Classification Search
USPC ......... 296/187.02, 203.01, 205, 204, 203.02, 296/203.03, 203.04, 163.09, 209, 30; 293/102
See application file for complete search history.

(56) References Cited

U.S. PATENT DOCUMENTS

| | | | |
|---|---|---|---|
| 6,474,726 B1* | 11/2002 | Hanakawa | B62D 25/04 296/187.12 |
| 7,077,461 B2* | 7/2006 | Ratet | B29C 44/18 277/645 |
| 7,318,873 B2* | 1/2008 | Czaplicki | B29C 70/70 156/293 |
| 9,764,769 B2* | 9/2017 | Boettcher | B62D 25/04 |
| 2002/0033618 A1* | 3/2002 | Kwon | B62D 25/04 296/203.03 |
| 2002/0174954 A1* | 11/2002 | Busseuil | B62D 25/00 156/349 |
| 2011/0206890 A1 | 8/2011 | Belpaire et al. | |
| 2015/0367889 A1 | 12/2015 | Eipper et al. | |

FOREIGN PATENT DOCUMENTS

| | | |
|---|---|---|
| JP | 2003-312404 A | 11/2003 |
| JP | 2014-196108 A | 10/2014 |
| JP | 2015-091690 A | 5/2015 |
| JP | 2015-523269 A | 8/2015 |

OTHER PUBLICATIONS

Translation of the International Preliminary Report on Patentability issued in corresponding International Application No. PCT/JP2017/015843; dated Nov. 29, 2018.

* cited by examiner

STRUCTURAL MEMBER

CROSS-REFERENCE TO RELATED APPLICATIONS

This is a national phase application in the United States of International Patent application No. PCT/JP2017/015843 with an international filing date of Apr. 20, 2017, which claims priority of Japanese Patent Application No. 2016-101663 filed on May 20, 2016 and Japanese Patent Application No. 2017-004495 filed on Jan. 13, 2017. The contents of these applications are incorporated herein by reference.

TECHNICAL FIELD

The present invention relates to a structural member for securing a structural strength of a member, and particularly to a bumper beam or a bumper reinforcement member that is used for a vehicle such as an automobile.

BACKGROUND ART

In general, a bumper is attached to front and rear parts of a vehicle body of an automobile or the like. In recent years, an outer surface of the bumper is covered with a resin member, and a cushioning member made of resin is provided on an inner surface thereof. On the further inside, a reinforcement member made of metal such as steel or aluminum is attached in a vehicle width direction (direction orthogonal to front-rear direction). This reinforcement member is referred to as a bumper beam or a bumper reinforcement member. In order to improve the maneuverability and the fuel efficiency by the weight reduction, the bumper beam has been reduced in weight by using high-tension steel (high-ten steel) or all-aluminum alloy (all-aluminizing). For the high-ten steel, steel materials with a tensile strength of about 980 MPa, 1200 MPa, 1500 MPa, and the like have come to be used instead of a conventional steel material with a tensile strength of about 590 MPa. On the other hand, in the weight reduction using the all-aluminum, aluminum extrusions of 6000 or 7000 series with the strength higher than that of the conventional ones are used. Other attempts have also been made; for example, a cross-sectional shape thereof is formed to be less deformed upon receipt of a collision load on a vehicle, so that the strength as the structure is increased, that is, the safety of the vehicle is enhanced.

On the other hand, in order to reduce the damage of a vehicle and a passenger at the time of collision of the vehicle, the state and the scale of the collision that are estimated, that is, the estimated collision speed and collision state have come to be more strict for the structure of the vehicle. This is because the vehicle ratings, which substantially correspond to the standard when determining the safety level of the vehicle against the collision, have been strengthened by public authorities (for example, Insurance Institute for Highway Safety (IIHS) or Research Council for Automobile Repairs (ROAR)). Therefore, the safety level of the vehicle against the collision needs to be enhanced and improved every time the model is updated.

Under such circumstances, the bumper beam has been required to be strong enough to withstand a higher collision load compared to the conventional ones. For example, the bumper beam with a bending strength of about 10 kNm has conventionally been used without a problem; however, it is expected that the bumper beam will be required to have a higher bending strength of 20 kNm or 40 kNm. In order to improve the bending strength of the bumper beam, it is effective to increase the thickness of the material or the strength of the material (using high-ten steel or high-strength aluminum), or enlarge the cross-sectional shape of the beam.

However, the thicker material results in heavier weight, and thus, the weight reduction is interrupted. Furthermore, increasing the thickness over a manufacturable range is impossible. In addition, there is a limitation in increasing the strength of the material, and it is said that the weight reduction by the use of the high-ten steel has almost reached the limit.

In order to enlarge the cross-sectional shape of the beam that is used for an automobile, for example, it is necessary to enlarge the space for installing the bumper. In the case of a large vehicle, the space for installing the bumper can be enlarged but in the case of a middle car or a compact car that is relatively small, enlarging the space for installing the bumper is restricted.

Note that such a situation is also the same in the case of using the bumper beam formed of other lightweight materials than steel or aluminum, such as magnesium or resin products including fiber reinforced plastic (FRP) or carbon fiber reinforced plastic (CFRP).

In a situation where the size of the member is restricted and the strength or the thickness of the material cannot be enlarged at once, it is difficult to increase the strength of the structural member drastically and at the same time, suppress the increase in weight. One of the solutions to such a problem is a composite structural member in which materials are mixed in a cross-sectional shape.

Using the composite structural member for the structural member has conventionally been attempted, and for example, JP 2003-312404 A discloses a composite structural member of a vehicle in which a steel pipe member and a light alloy or a synthetic resin member are combined.

SUMMARY OF THE INVENTION

Problems to be Solved by the Invention

In the structure disclosed in JP 2003-312404 A, however, the steel pipe material and the lightweight metal or the synthetic resin member, which are different kinds of material members, are directly bonded to each other, and galvanic corrosion between the different kinds of material members is not considered.

In view of the above, an object of the present invention is to provide a structural member that can increase a strength of a member while suppressing increase in weight and cost of the member and decrease in workability, in which occurrence of the galvanic corrosion between members formed of different materials can be suppressed.

Means for Solving the Problems

An aspect of the present invention is a structural member including: an inner member; and an outer member formed of a material different from that of the inner member, the outer member being positioned outside the inner member so as to surround the inner member and including a first adjacent surface adjacent to an outer surface of the inner member, wherein an insulator is disposed between the first adjacent surface and a second adjacent surface of the inner member, the second adjacent surface being adjacent to the first adjacent surface.

According to the above configuration, the structural member includes the inner member and the outer member formed of the different materials, and thus the member can be increased in strength while suppressing increase in weight and cost of the member and decrease in workability of the member. In addition, by disposing the insulator at the adjacent portion between the inner member and the outer member, occurrence of the galvanic corrosion between the inner member and the outer member formed of the different materials can be suppressed.

In addition, the above aspect preferably includes the following configurations.

(1) The insulator is preferably disposed on an entire portion between the first adjacent surface and the second adjacent surface.

According to the configuration (1), the insulator is disposed on the entire adjacent portion between the inner member and the outer member, so that occurrence of the galvanic corrosion between the inner member and the outer member can be suppressed more certainly.

(2) The insulator is preferably disposed at a border part between the first adjacent surface and the second adjacent surface, and an outside.

According to the configuration (2), since the insulator is disposed at the border part between the adjacent portion between the inner member and the outer member, and the outside, an amount of insulator to be used can be reduced as compared to a case in which the insulator is disposed at the entire adjacent portion. In addition, entry of water or the like, which causes the galvanic corrosion, into the adjacent portion between the inner member and the outer member can be suppressed.

(3) It is preferable that at least one opposite surface of the outer member that is opposed to the inner member includes one or more inward protrusion surfaces that protrude toward the inner member in a cross-sectional view, and the inward protrusion surface corresponds to the first adjacent surface.

According to the configuration (3), since the inward protrusion surface of the outer member corresponds to the first adjacent surface that is adjacent to the inner member, a contact area with the inner member can be reduced and therefore, the amount of insulator to be used can be reduced.

(4) It is preferable that at least one opposite surface of the inner member that is opposed to the outer member includes one or more outward protrusion surfaces that protrude toward the outer member in a cross-sectional view, and the outward protrusion surface corresponds to the second adjacent surface.

According to the configuration (4), since the outward protrusion surface of the inner member corresponds to the second adjacent surface that is adjacent to the outer member, the contact area with the outer member can be reduced and therefore, the amount of insulator to be used can be reduced.

(5) It is preferable that the outer member includes a longitudinal direction, and the inner member extends along an entire length of the outer member in the longitudinal direction.

According to the configuration (5), the strength of the structural member can be increased along the entire length of the outer member in the longitudinal direction.

(6) It is preferable that the outer member includes a longitudinal direction, and the inner member extends by a length of a part of a length of the outer member in the longitudinal direction at an intermediate part of the outer member in the longitudinal direction.

According to the configuration (6), the length of the inner member in the longitudinal direction can be adjusted in accordance with the portion where the strength needs to be increased. Therefore, the cost of the structural member can be reduced.

(7) It is preferable that the outer member is formed of a steel material with a tensile strength of 1180 MPa or more, and the inner member is formed of an aluminum alloy with a tensile strength of 340 MPa or more.

According to the configuration (7), since the suitable material and the strength thereof regarding the outer member and the inner member are defined, the structural member with a desired strength and a shock absorbing characteristic can be obtained.

Effect of the Invention

According to the present invention, provided is a structural member that can increase a strength of a member while suppressing increase in weight and cost of the member and decrease in workability, in which occurrence of galvanic corrosion between members formed of different materials can be suppressed.

EMBODIMENTS OF THE INVENTION

Figure 1:
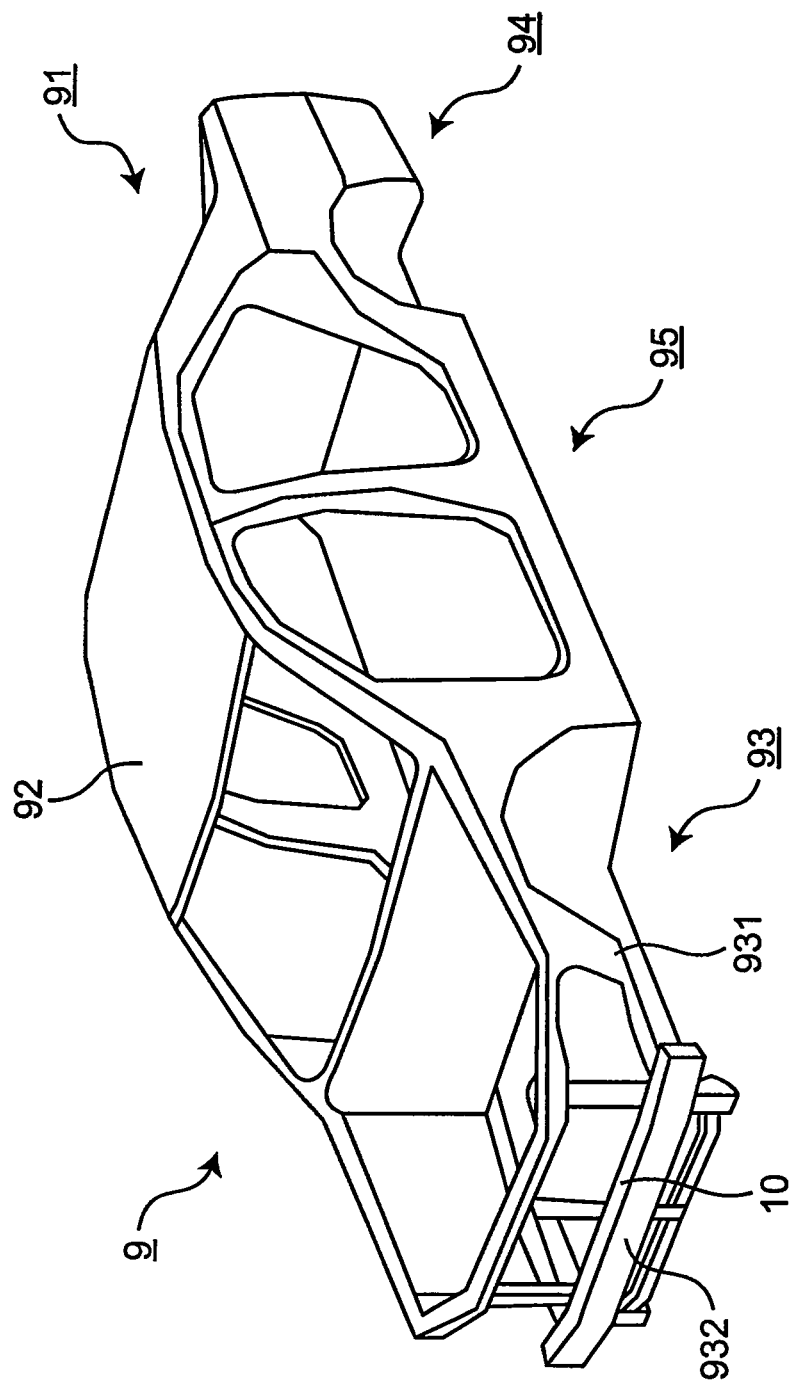
FIG. 1 is a perspective view of a vehicle body structure of an automobile in which a structural member according to an embodiment of the present invention is used.

FIG. 1 is a perspective view of a vehicle body structure 9 of an automobile in which a structural member 10 according to an embodiment of the present invention is used. As illustrated in FIG. 1, the vehicle body structure 9 includes a frame body 91 to be a frame of a vehicle body, and a roof panel 92 that is placed on the frame body 91 and bonded to the frame body 91.

The frame body 91 includes a front part 93, a rear part 94, and a center part 95. The front part 93 forms a front part of the vehicle body, and includes a front frame 931 and a front bumper 932. The front frame 931 forms a frame of the front part 93. At a center of the front frame 931, an engine housing part for housing an engine or the like is formed. At both end parts of the front frame 931 in a vehicle width direction, front wheel housing parts for housing front wheels are formed. The front bumper 932 is disposed to extend in the vehicle width direction at a front part of the front frame 931, and is fixed to the front frame 931.

The structural member 10 is, for example, a bumper beam or a bumper reinforcement member that is used for a vehicle such as an automobile. The bumper beam or the bumper reinforcement member is, for example, attached inside the front bumper 932 in order to reduce the damage on the vehicle body at the time of collision at low speed.

Figure 2:
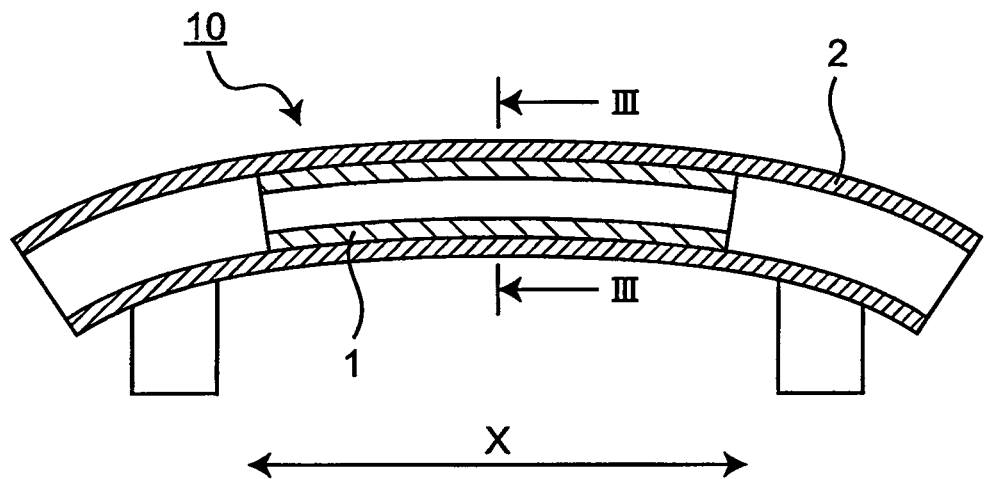
FIG. 2 is a horizontal cross-sectional view of the structural member.
Figure 3:
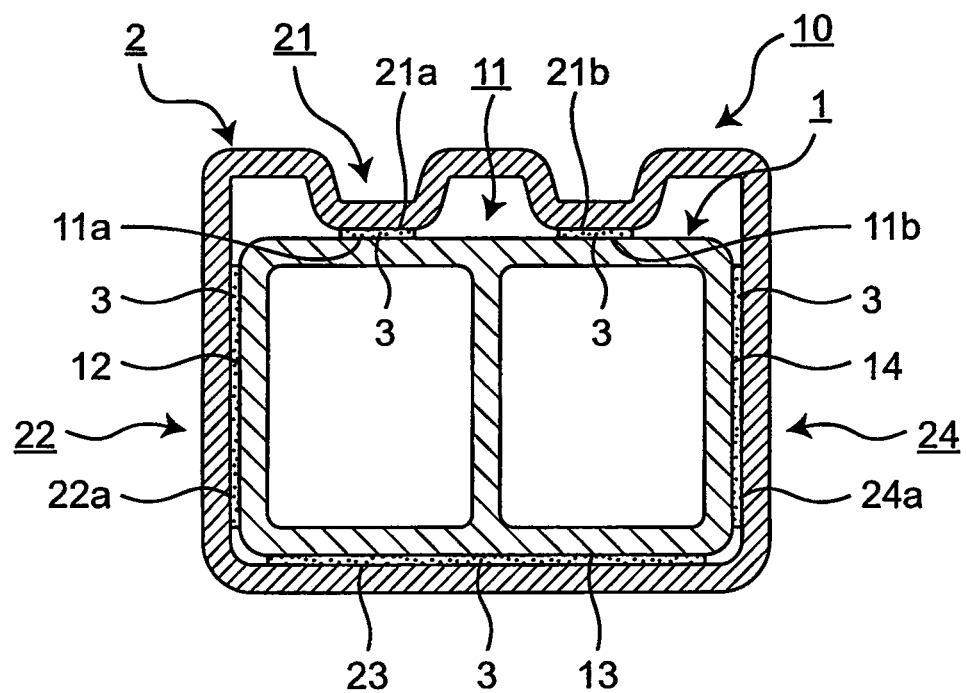
FIG. 3 is a cross-sectional view taken along in FIG. 2.

FIG. 2 is a horizontal cross-sectional view of the structural member 10, and FIG. 3 is a cross-sectional view taken along in FIG. 2. As illustrated in FIG. 2 and FIG. 3, the structural member 10 includes an inner member 1, and an outer member 2 that is formed of a material different from that of the inner member 1 and that is disposed outside the inner member 1 so as to surround the inner member 1. The structural member 10 is fabricated by performing roll forming of the outer member 2 outside the inner member 1 so as to cover the inner member 1. The procedure of manufacturing the structural member 10 is described below.

At an intermediate part of the outer member 2 in a longitudinal direction (X-direction), the inner member 1 extends by a length of a part of the length of the outer member 2 in the longitudinal direction.

The inner member 1 is formed of an aluminum alloy, for example, and has a hollow shape with a penetration hole in a cross-sectional view. The aluminum alloy of the inner member has a tensile strength of 340 MPa or more. In the cross-sectional view, the inner member 1 includes opposite surfaces 11 to 14 that are opposed to the outer member 2.

The outer member 2 is made of, for example, high-tension steel, and is formed so as to cover an outer surface of the inner member 1 in the cross-sectional view. The steel material of the outer member 2 has a tensile strength of 1180 MPa or more. The outer member 2 includes opposite surfaces 21 to 24 that are opposed to the inner member 1 in the cross-sectional view. The opposite surface 21 includes two inward protrusion surfaces 21a and 21b that protrude inward to the inner member 1.

The inward protrusion surfaces 21a and 21b of the outer member 2 are adjacent to the opposite surface 11 of the inner member 1. The inward protrusion surfaces 21a and 21b of the outer member 2 correspond to first adjacent surfaces, and parts 11a and 11b of the opposite surface 11 of the inner member 1 that are adjacent to the inward protrusion surfaces 21a and 21b correspond to second adjacent surfaces.

The opposite surface 12 of the inner member 1 is adjacent to the opposite surface 22 of the outer member 2. The opposite surface 12 of the inner member 1 corresponds to the second adjacent surface, and a part 22a of the opposite surface 22 of the outer member 2 that is adjacent to the opposite surface 12 corresponds to the first adjacent surface.

The opposite surface 13 of the inner member 1 is adjacent to the opposite surface 23 of the outer member 2. Then, the opposite surface 13 of the inner member 1 corresponds to the second adjacent surface, and the opposite surface 23 of the outer member 2 corresponds to the first adjacent surface.

The opposite surface 14 of the inner member 1 is adjacent to the opposite surface 24 of the outer member 2. Then, the opposite surface 14 of the inner member 1 corresponds to the second adjacent surface, and a part 24a of the opposite surface 24 of the outer member 2 that is adjacent to the opposite surface 14 corresponds to the first adjacent surface.

Between the second adjacent surface of the inner member 1 and the first adjacent surface of the outer member 2, an insulator 3 is disposed. The insulator 3 is a material that secures insulation between the inner member 1 and the outer member 2, and includes an adhesive with an insulating property, a foaming agent with an insulating property, or the like. The adhesive with an insulating property includes, for example, an epoxy-based thermosetting adhesive. The foaming agent with an insulating property includes, for example, a thermosetting adhesive of a foaming type.

Figure 4A:
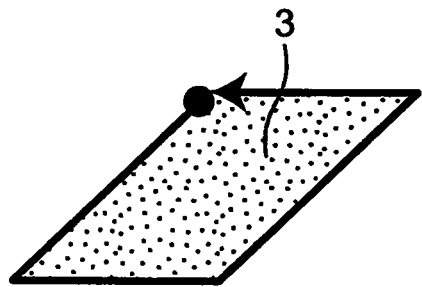
FIG. 4A is a schematic view illustrating an application pattern of an insulator.
Figure 4B:
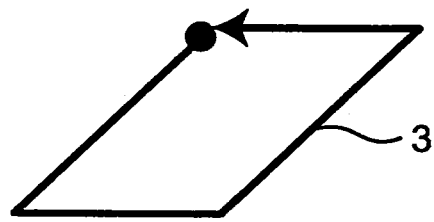
FIG. 4B is a schematic view illustrating an application pattern of the insulator.
Figure 4C:
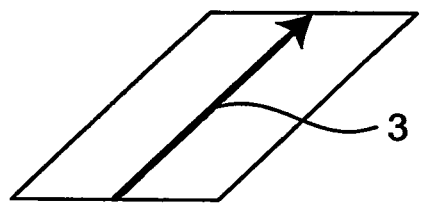
FIG. 4C is a schematic view illustrating an application pattern of the insulator.
Figure 4D:
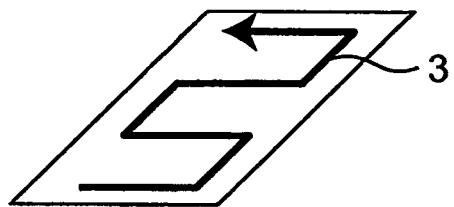
FIG. 4D is a schematic view illustrating an application pattern of the insulator.

In a case where the insulator 3 is disposed by application between the second adjacent surface of the inner member 1 and the first adjacent surface of the outer member 2, the insulator 3 can be disposed in various application patterns on the basis of an area of an adjacent portion between the second adjacent surface of the inner member 1 and the first adjacent surface of the outer member 2. In a case where the area of the adjacent portion between the inner member 1 and the outer member 2 is relatively small, that is, in a case where a part of the opposite surface of the inner member 1 and a part of the opposite surface of the outer member are in contact with each other, for example, if the inward protrusion surfaces 21a and 21b and the parts 11a and 11b are in contact with each other, the insulator 3 may be applied to the entire adjacent portion as illustrated in FIG. 4A. In the case where the insulator 3 is applied to the entire adjacent portion, the insulator 3 is applied to a periphery of the adjacent portion and moreover to the entire part inside the periphery of the adjacent portion. However, if the inward protrusion surfaces 21a and 21b and the parts 11a and 11b are in contact with each other, the insulator 3 may be applied to only the periphery of the adjacent portion as illustrated in FIG. 4B. Alternatively, instead of applying the insulator 3 to the periphery of the adjacent portion, the insulator 3 may be applied in a straight line shape to a part inside the periphery of the adjacent portion as illustrated in FIG. 4C. Further, instead of applying the insulator 3 to the periphery of the adjacent portion, the insulator 3 may be applied in a continuous line shape with a bent portion to a part inside the periphery of the adjacent portion as illustrated in FIG. 4D.

Figure 5A:
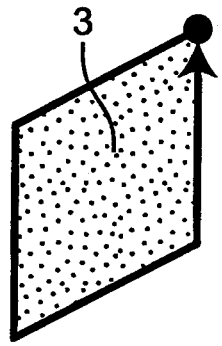
FIG. 5A is a schematic view illustrating an application pattern of the insulator.
Figure 5B:
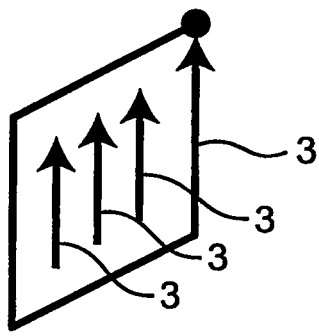
FIG. 5B is a schematic view illustrating an application pattern of the insulator.
Figure 5C:
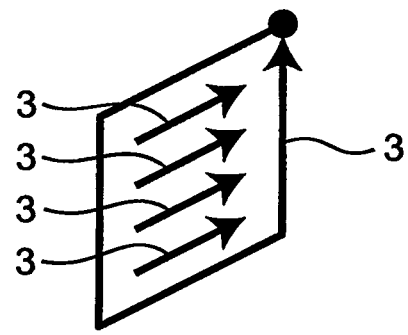
FIG. 5C is a schematic view illustrating an application pattern of the insulator.
Figure 5D:
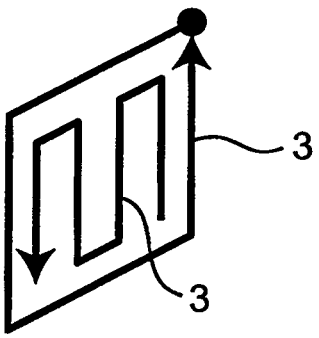
FIG. 5D is a schematic view illustrating an application pattern of the insulator.
Figure 5E:
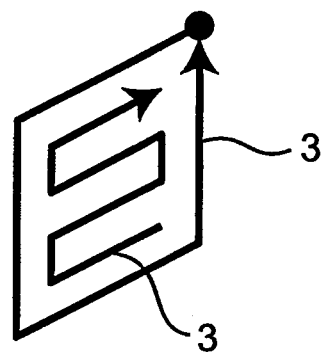
FIG. 5E is a schematic view illustrating an application pattern of the insulator.
Figure 6:
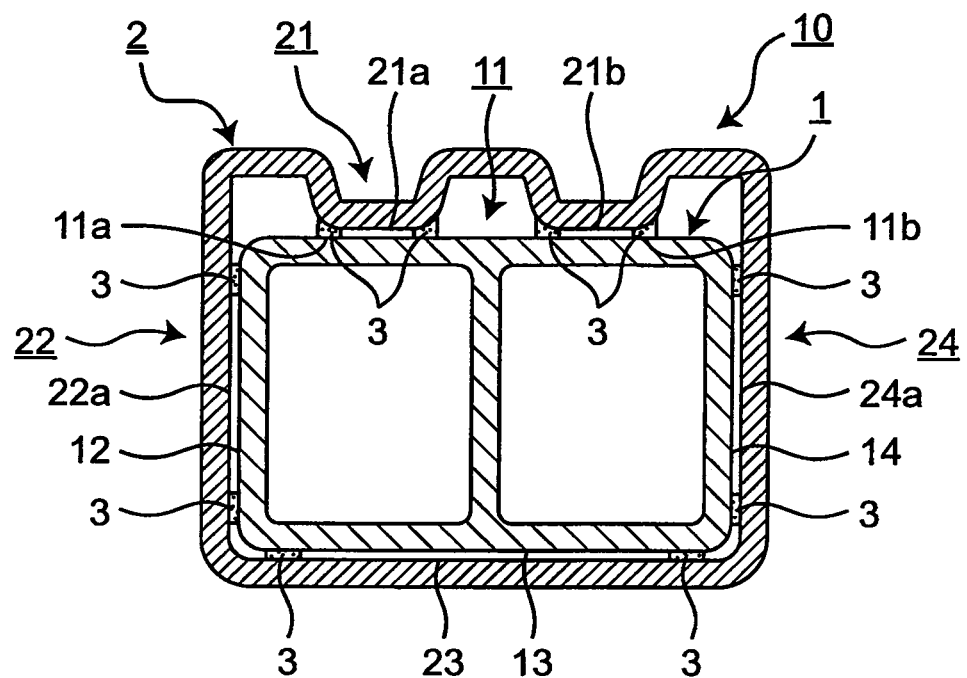
FIG. 6 is a vertical cross-sectional view in which the insulator is disposed at a border part between a second adjacent surface of an inner member 1 and a first adjacent surface of an outer member 2, and an outside.

On the other hand, in a case where the area of the adjacent portion between the inner member 1 and the outer member 2 is relatively large, that is, in a case where the entire opposite surface of the inner member 1 is in contact with the outer member 2, for example, if the opposite surface 12 and the part 22a are in contact with each other, the opposite surface 13 and the opposite surface 23 are in contact with each other, or the opposite surface 14 and the part 24a are in contact with each other, the insulator 3 may be applied to the entire adjacent portion as illustrated in FIG. 5A. In the case where the insulator 3 is applied to the entire adjacent portion, the insulator 3 is applied to the periphery of the adjacent portion and is further applied to the entire part inside the periphery of the adjacent portion. However, if the opposite surface 12 and the part 22a are in contact with each other, the opposite surface 13 and the opposite surface 23 are in contact with each other, or the opposite surface 14 and the part 24a are in contact with each other, the insulator 3 may be applied to the periphery of the adjacent portion and a part inside the periphery of the adjacent portion as illustrated in FIG. 5B to FIG. 5E. Alternatively, in the case of applying the insulator 3 to a part inside the periphery of the adjacent portion, the insulator 3 may be applied in a shape of a plurality of parallel lines as illustrated in FIG. 5B and FIG. 5C, or in a continuous line shape with a bent portion as illustrated in FIG. 5D and FIG. 5E. FIG. 6 is a vertical cross-sectional view of the structural member 10 in FIG. 3, in which the insulator 3 is disposed at the periphery of the adjacent portion between the inner member 1 and the outer member 2, that is, at a border part between the second adjacent surface of the inner member 1 and the first adjacent surface of the outer member 2, and the outside.

In the case where the insulator 3 is disposed by being applied between the second adjacent surface of the inner member 1 and the first adjacent surface of the outer member 2, the insulator 3 may be applied only to the portion of the second adjacent surface of the inner member 1, only to the portion of the first adjacent surface of the outer member 2, or to both the portion of the second adjacent surface of the inner member 1 and the portion of the first adjacent surface of the outer member 2.

The procedure of manufacturing the structural member 10 is described below with reference to FIG. 7A to FIG. 7D.

Figure 7A:
FIG. 7A is a cross-sectional view illustrating a procedure of manufacturing the structural member.
Figure 7B:
FIG. 7B is a cross-sectional view illustrating the procedure of manufacturing the structural member.

First, the outer member 2 with a flat plate shape as illustrated in FIG. 7A is bent by roll forming as illustrated in FIG. 7B.

Figure 7C:
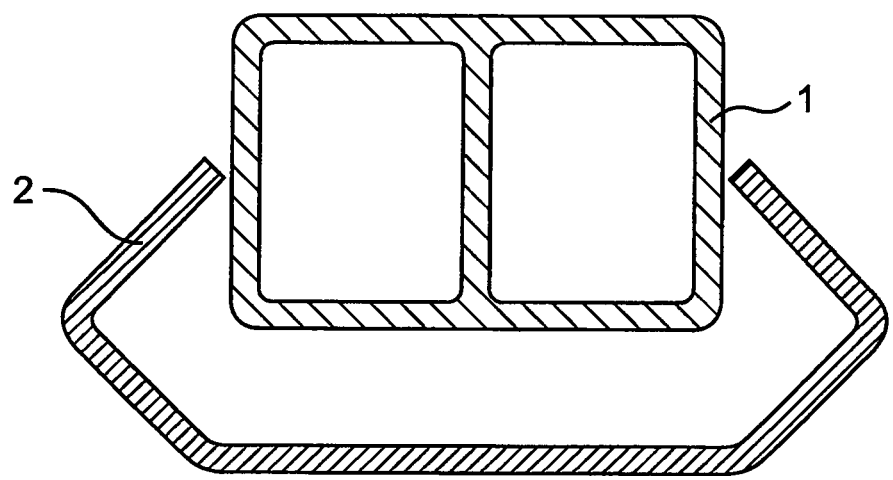
FIG. 7C is a cross-sectional view illustrating the procedure of manufacturing the structural member.

Next, as illustrated in FIG. 7C, the inner member 1 is introduced into the outer member 2 in an arbitrary process of the roll forming of the outer member 2.

Note that the insulator 3 is disposed (applied) to the second adjacent surface of the inner member 1 and/or the first adjacent surface of the outer member 2. The insulator 3 may be applied before start of the roll forming of the outer member 2 or during the roll forming of the outer member 2.

Figure 7D:
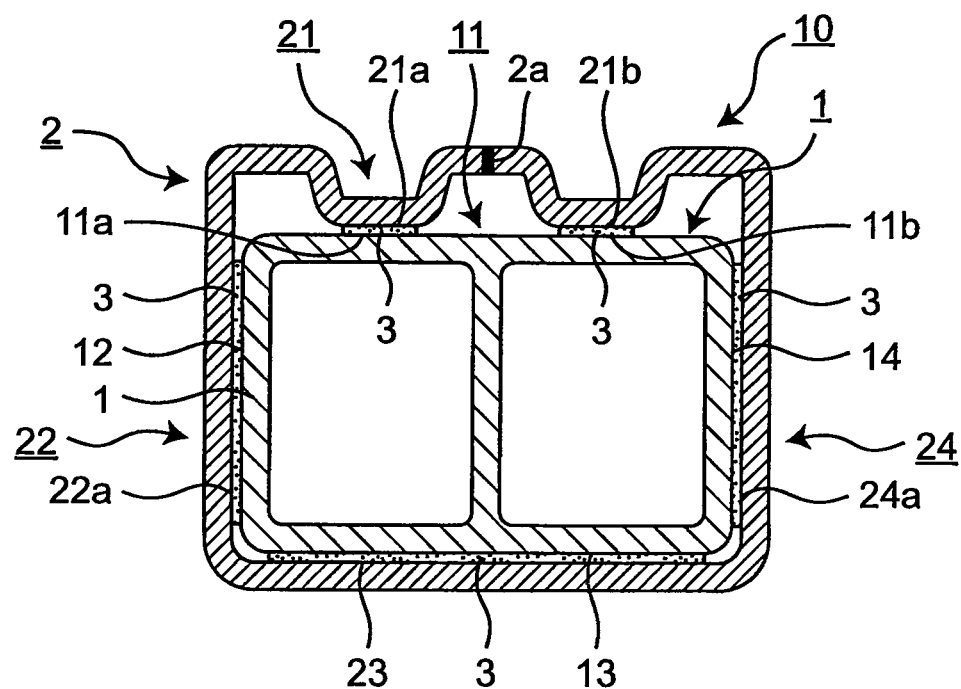
FIG. 7D is a cross-sectional view illustrating the procedure of manufacturing the structural member.

After the inner member 1 is introduced into the outer member 2, the roll forming of the outer member 2 is further performed. Then, as illustrated in FIG. 7D, both end surfaces of the outer member 2 are bonded by welding at the end of the roll forming so that the outer member 2 completely covers the outer surface of the inner member 1; thus, a welded part 2a is formed. In order to reduce the influence of the welding heat on the outer member 2, the inward protrusion surfaces 21a and 21b are formed in the outer member 2 on both sides of the welded part 2a by the roll forming before the welding, so that the inner member 1 is prevented from coming into contact with the welded part 2a of the outer member 2. Thus, the welded part 2a is disposed apart from the inner member 1 to the outside.

Thereafter, as illustrated in FIG. 2, the structural member 10 is bent so that the structural member 10 is rounded entirely along the longitudinal direction.

Figure 8:
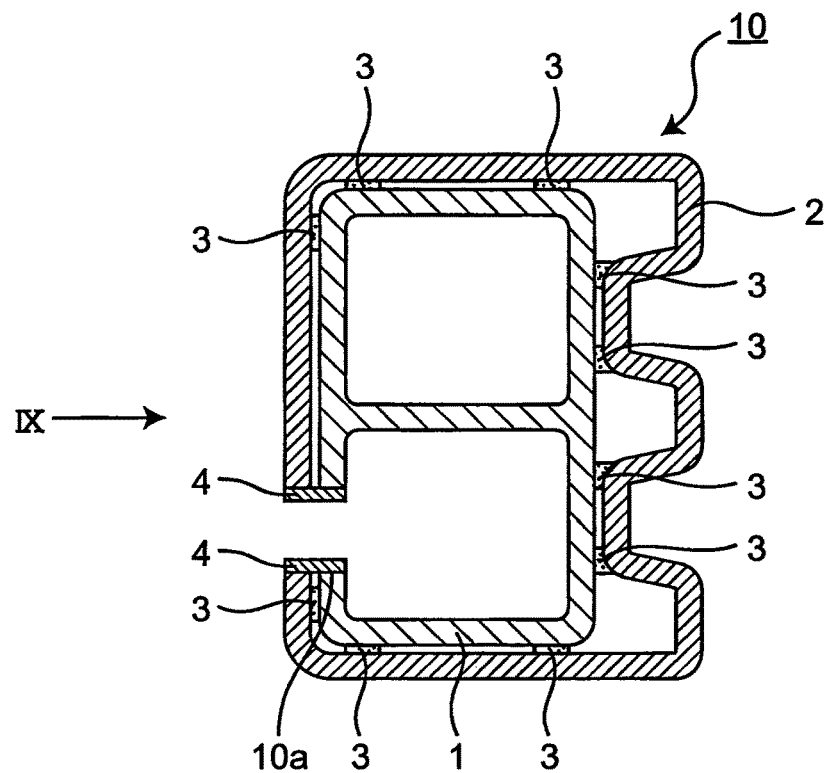
FIG. 8 is a cross-sectional view illustrating the structural member provided with a traction hole.
Figure 9:
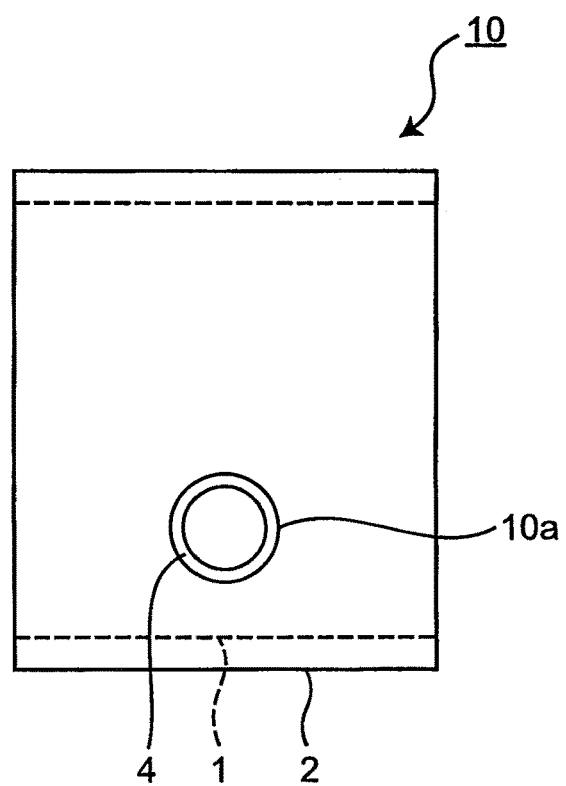
FIG. 9 is a diagram viewed from an arrow IX in FIG. 8.

After the bending process, the structural member 10 is treated with phosphate and then, electrodeposition is performed. After the electrodeposition is performed, the structural member 10 is dried using a furnace or the like, so that the insulator 3 is hardened. After the structural member 10 is dried, a traction hole is formed in the structural member 10. FIG. 8 is a cross-sectional view of the structural member 10 provided with the traction hole, and FIG. 9 is a diagram viewed from an arrow IX in FIG. 8. In the case where a traction hole 10a is formed in the structural member 10 as illustrated in FIG. 8 and FIG. 9, a sealing member 4 is attached to the traction hole 10a. The sealing member 4 includes, for example, a modified silicon resin sealing material, or a urethane resin sealing material. Note that the insulator 3 is not disposed at a portion where the traction hole 10a is formed.

Figure 10:
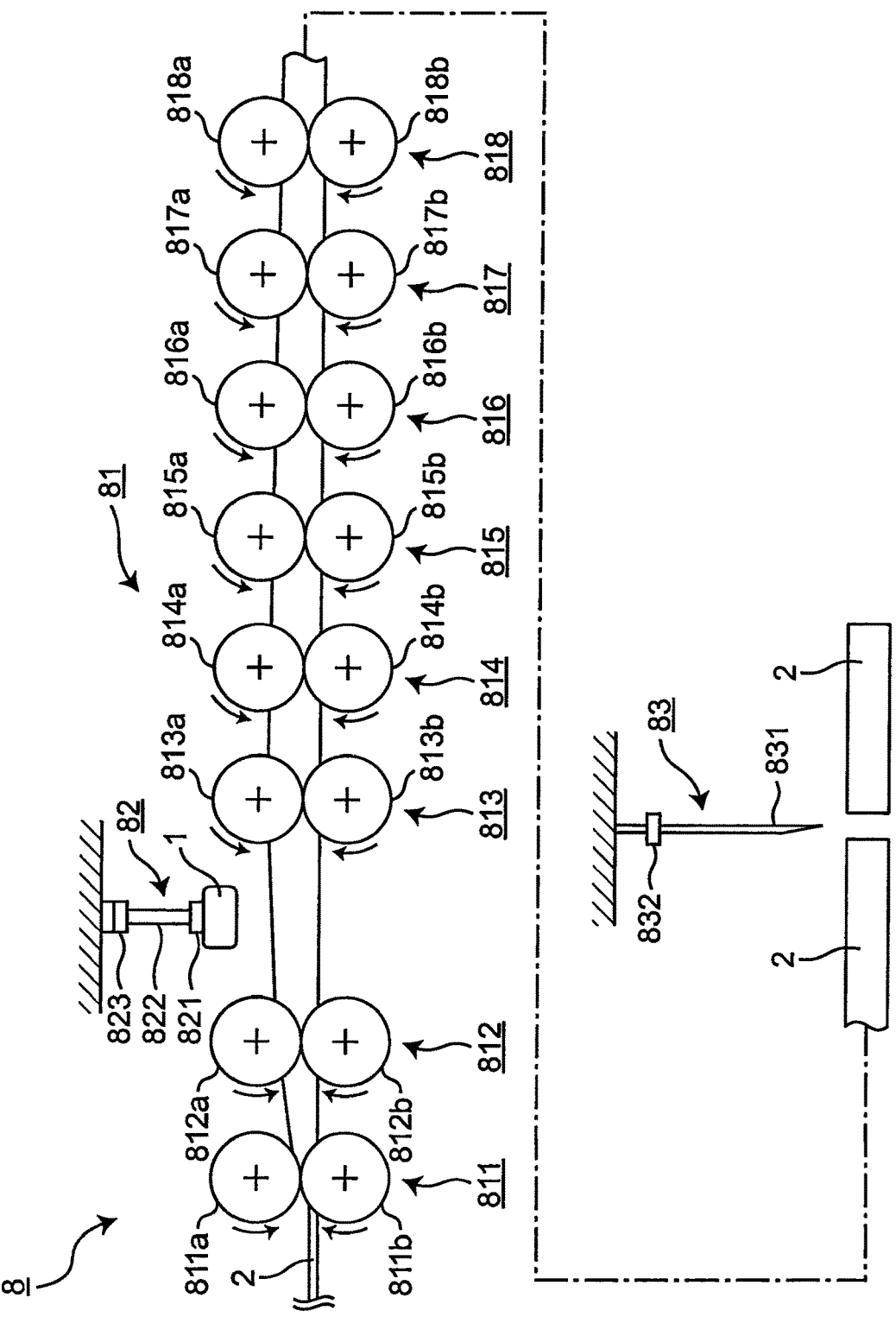
FIG. 10 is a schematic view of a manufacturing apparatus for the structural member.

The roll forming of the structural member 10 is performed by a manufacturing apparatus 8 illustrated in FIG. 10.

The manufacturing apparatus 8 includes a roll forming machine 81 including roll pairs 811 to 818, a robot arm 82, and a cutter 83.

The roll pairs 811 to 818 constitute an eight-stage structure, and the structural member 10 is formed in eight steps of first to eighth steps. The roll pairs 811 to 818 include upper rolls 811a to 818a and lower rolls 811b to 818b, respectively. The upper rolls 811a to 818a each include a protrusion that has a protruding shape toward the lower rolls 811b to 818b. The lower rolls 811b to 818b each include a recess that has a complementary shape to the protrusion. The upper rolls 811a to 818a and the lower rolls 811b to 818b are rotatably supported, and are rotated and driven by a driving mechanism that is not shown. The outer member 2 that is sent into the roll pairs 811 to 818 is held between the upper rolls 811a to 818a and the lower rolls 811b to 818b that are rotated and driven, and formed to have a predetermined cross-sectional shape. The upper rolls 811a to 818a and the lower rolls 811b to 818b include terms "upper" and "lower"; however, these terms are used for convenience, and the arrangement is not limited to the above arrangement in the up-down direction.

In the present embodiment, the robot arm 82 used for inserting the inner member 1 is provided between the second roll pair 812 and the third roll pair 813. The robot arm 82 includes a grip part 821, an arm 822, and an operation part 823. The grip part 821 is disposed at a lower end of the robot arm 82, and is used to grip the inner member 1. The arm 822 has one end connected to the grip part 821 and the other end connected to the operation part 823. The operation part 823 operates the arm 822 and moves up and down and rotates the grip part 821 connected to the arm 822. Therefore, the robot arm 82 can insert the inner member 1 into the outer member 2 during the formation at arbitrary position and angle. Note that the robot arm 82 may be disposed at any position in the formation process, and the position of the robot arm 82 is not limited to the position between the second roll pair 812 and the third roll pair 813. Furthermore, the robot arm 82 may be disposed on the upstream side of the first roll pair 811.

In the present embodiment, a step of cutting the structural member 10 to a predetermined length is provided on the downstream side of the eighth roll pair 818. This cutting is performed by the cutter 83. The cutter 83 includes a blade 831 at a lower end and an operation part 832 at an upper part. The blade 831 is used to cut the structural member 10 and the operation part 832 is used to move the blade 831 up and down.

The structural member 10 with the above configuration can exhibit the following effects.

(1) The structural member 10 includes the inner member 1 and the outer member 2 that are formed of different materials. Thus, the strength of the member can be increased while suppressing the increase in weight and cost of the member and the decrease in workability of the member.

This effect is described more specifically. In a case where the bending strength necessary for the structural member 10 is set and the plate thickness necessary for the structural member 10 is obtained, if the structural member 10 is prepared using only the outer member 2 that is formed of high-tension steel, the necessary plate thickness is very large considering the thickness of the high-tension steel that can be manufactured and the restriction in the manufacturing process becomes more strict. That is, it becomes difficult to cut the plate or perform the processing, for example, and the processing cost increases or the manufacture becomes difficult. In this case, it is not practical. On the other hand, if the structural member 10 is prepared using only the inner member 1 that is formed of the aluminum alloy, the necessary plate thickness is very large as the aluminum extrusions. In this case, the cross-sectional shape is not appropriate for the mass production, and the material cost becomes high.

In view of the above, the structural member 10 is prepared using a composite member of the inner member 1 formed of the aluminum alloy and the outer member 2 formed of the high-tension steel. In this case, the thickness necessary for the inner member 1 and the thickness necessary for the outer member 2 can be the thickness that does not lead to a problem in the manufacturing process.

That is, in order to achieve the high bending strength that is required, the necessary thickness is the thickness that is difficult to obtain from the high-tension steel alone or the aluminum alloy alone. However, in the case of using the material in which the high-tension steel and the aluminum alloy are combined, the aluminum alloy prevents the buckling of the high-tension steel and the effects from both the high-tension steel and the aluminum alloy can be obtained. Thus, the thickness necessary for the high-tension steel and the aluminum alloy can be the thickness that does not lead to a problem in the manufacturing process. Therefore, the structural member 10 that can have the high bending strength can be prepared.

(2) The insulator 3 is disposed between the second adjacent surface of the inner member 1 and the first adjacent surface of the outer member 2. Therefore, the galvanic corrosion between the inner member 1 and the outer member 2 that are formed of different materials can be suppressed.

(3) In the case of disposing the insulator 3 as illustrated in FIG. 4A and FIG. 5A, the insulator 3 is disposed on the entire portion between the first adjacent surface and the second adjacent surface; therefore, the galvanic corrosion between the inner member 1 and the outer member 2 can be suppressed more certainly.

(4) In the case of disposing the insulator 3 as illustrated in FIG. 4B and FIG. 5B to FIG. 5E, the insulator 3 is disposed at the border part between the first adjacent surface and the second adjacent surface, and the outside. Thus, as compared to the case in which the insulator 3 is disposed at the entire adjacent portion, an amount of the insulator 3 to be used can be reduced. Furthermore, in the case of disposing the insulator 3 by application, the application time of the insulator 3 can be shortened. In addition, the entry of water or the like, which causes the galvanic corrosion, into the adjacent portion between the inner member 1 and the outer member 2 can be suppressed.

(5) Since the inward protrusion surfaces 21a and 21b of the outer member 2 correspond to the first adjacent surface that is adjacent to the inner member 1, the contact area with the inner member 1 can be reduced and therefore, the amount of the insulator 3 to be used can be reduced. Furthermore, in the case of disposing the insulator 3 by application, the application time of the insulator 3 can be shortened. In addition, by providing the inward protrusion surface to the outer member 2, the buckling strength of the outer member 2 can be increased.

(6) At an intermediate part of the outer member 2 in the longitudinal direction, the inner member 1 extends by a length of a part of the length of the outer member 2 in the longitudinal direction. Therefore, the length of the inner member 1 in the longitudinal direction can be adjusted in accordance with the portion where the strength needs to be increased and as a result, the cost of the structural member 10 can be reduced.

(7) The outer member 2 is made of the steel material, and this steel material has a tensile strength of 1180 MPa or more. The inner member 1 is made of the aluminum alloy, and this aluminum alloy has a tensile strength of 340 MPa or more. By defining the material and the strength appropriate for the outer member 2 and the inner member 1, the structural member 10 with the desired strength and shock absorbing characteristic can be obtained.

(8) Since the structural member 10 is bent to be rounded entirely along the longitudinal direction, the inner member 1 and the outer member 2 can be caulked uniformly.

(Modifications)

Figure 11:
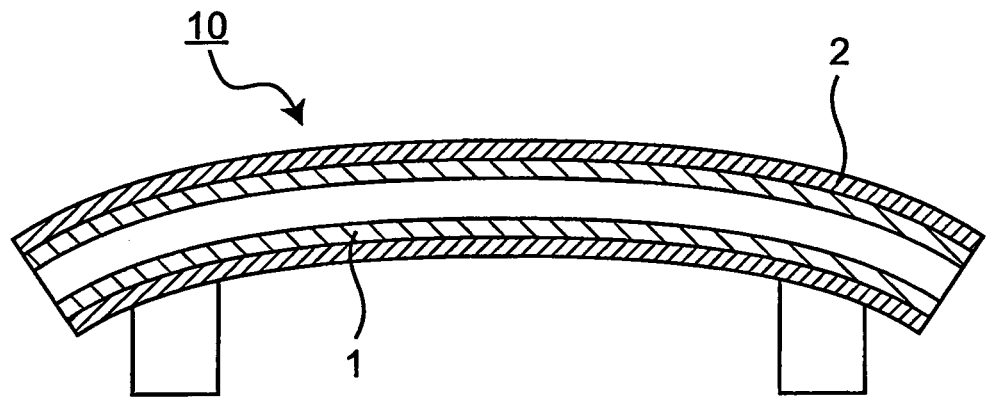
FIG. 11 is a horizontal cross-sectional view illustrating a modification of the structural member, in which a length of the inner member in a longitudinal direction is changed.

In the above embodiment, the inner member 1 extends by a length of a part of the length of the outer member 2 in the longitudinal direction at the intermediate part of the outer member 2 in the longitudinal direction. However, the inner member may extend along the entire length of the outer member 2 in the longitudinal direction as illustrated in FIG. 11. In this case, the strength of the structural member 10 can be increased along the entire length of the outer member 2 in the longitudinal direction.

Figure 12:
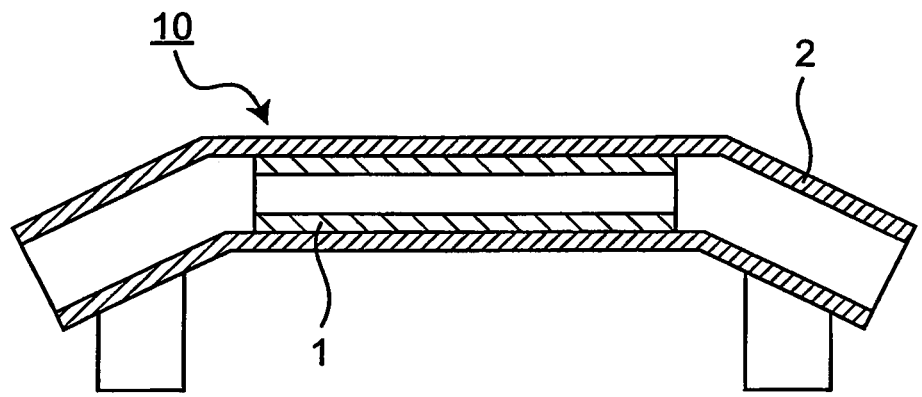
FIG. 12 is a horizontal cross-sectional view illustrating a modification of the structural member, in which the structural member is bent.

In the above embodiment, the structural member 10 is bent to be rounded entirely along the longitudinal direction; however, apart of the structural member 10 in the longitudinal direction may be bent to be rounded as illustrated in FIG. 12. In this case, basically, a part without the inner member 1 is rounded, and thus the inner member 1 is less likely to receive a load in the bending process, and the separation of the insulator 3 is less likely to occur.

Figure 13:
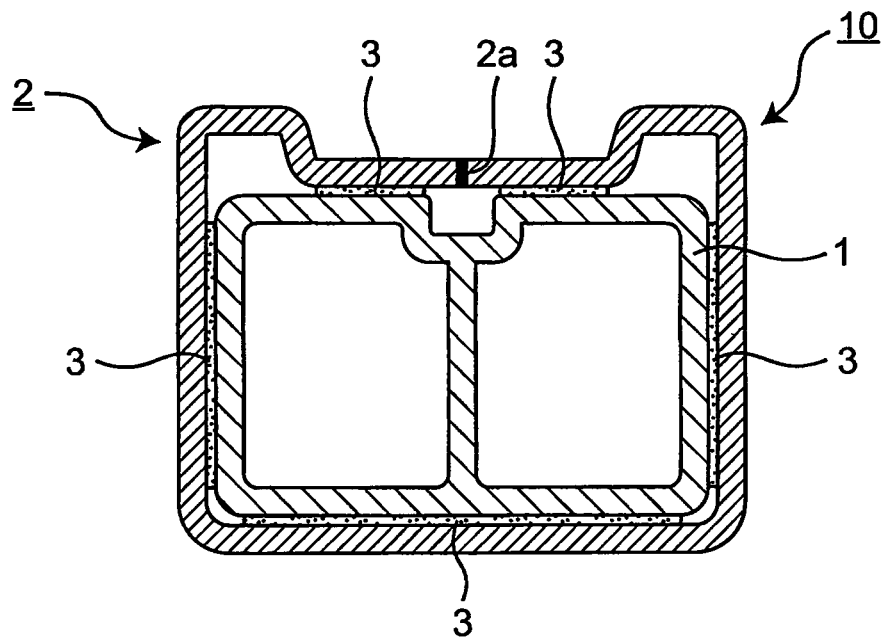
FIG. 13 is a vertical cross-sectional view illustrating a modification in which a part of the inner member that is opposed to a welded part of the outer member is formed to be depressed inward.

In the above embodiment, in order to reduce the influence of the welding heat on the outer member 2, the inward protrusion surfaces 21a and 21b are formed in the outer member 2 on both sides of the welded part 2a by the roll forming before the welding, so that the inner member 1 is prevented from coming into contact with the welded part 2a of the outer member 2. However, in order to prevent the inner member 1 from coming into contact with the welded part 2a of the outer member 2, a part of the inner member 1 that is opposed to the welded part 2a of the outer member 2 may be formed to be depressed inward as illustrated in FIG. 13.

Figure 14:
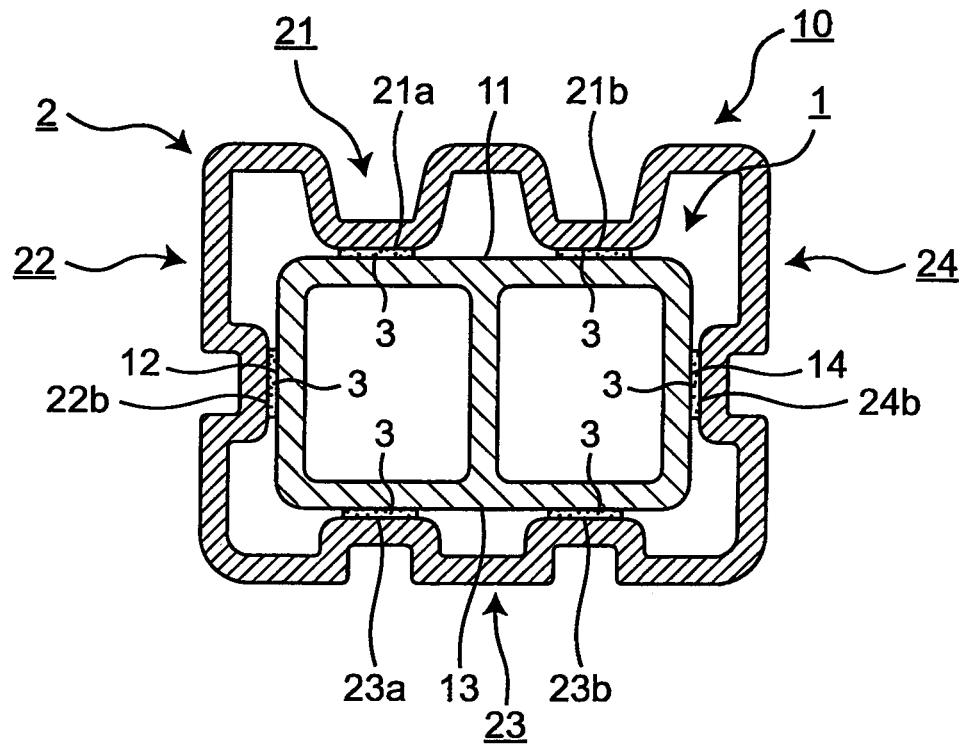
FIG. 14 is a vertical cross-sectional view illustrating a modification in which other opposite surfaces of the outer member include inward protrusion surfaces.

In the above embodiment, the opposite surface 21 of the outer member 2 includes the inward protrusion surfaces 21a and 21b; however, another opposite surface of the outer member 2 may also include the inward protrusion surface. FIG. 14 illustrates a modification in which the opposite surface 21 of the outer member 2 includes the inward protrusion surfaces 21a and 21b, the opposite surface 22 includes an inward protrusion surface 22b, the opposite surface 23 includes inward protrusion surfaces 23a and 23b, and the opposite surface 24 includes an inward protrusion surface 24b. Here, an arbitrary opposite surface of the outer member 2 may include the inward protrusion surface, and one opposite surface may include one or two or more inward protrusion surfaces. At the opposite surface where the inward protrusion surface is formed, the inward protrusion surface corresponds to the first adjacent surface that is adjacent to the inner member 1.

With the above structure, the inward protrusion surfaces 21a, 21b, 22b, 23a, 23b, and 24b of the outer member 2 correspond to the first adjacent surfaces that are adjacent to the inner member 1. Thus, the contact area with the inner member 1 can be reduced and accordingly, the amount of the insulator 3 to be used can be reduced. In the case where the insulator 3 is disposed by application, the application time of the insulator 3 can be shortened.

Figure 15:
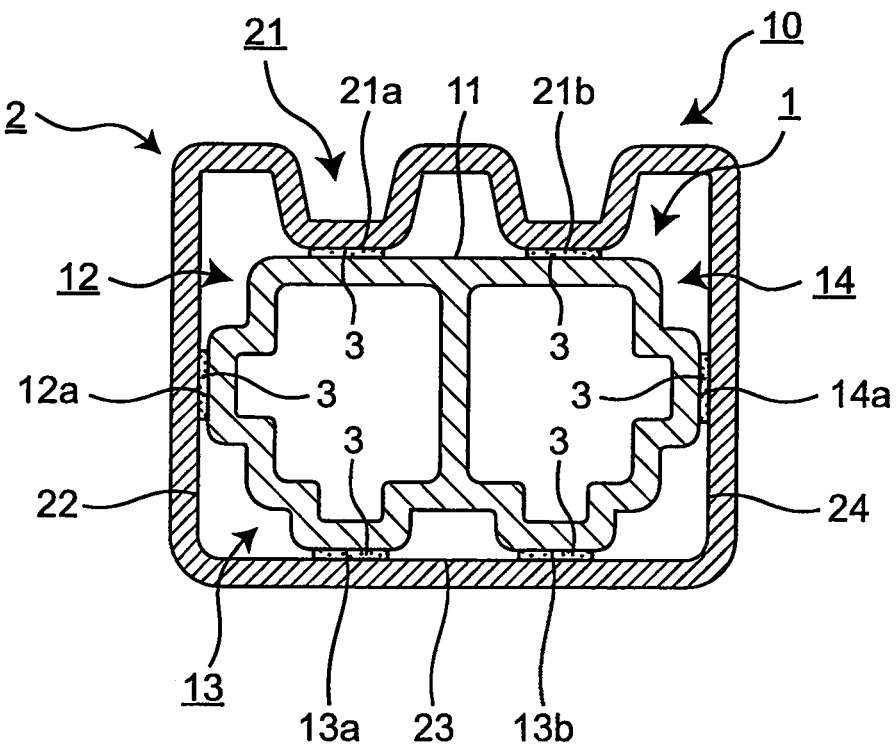
FIG. 15 is a vertical cross-sectional view illustrating a modification in which other opposite surfaces of the inner member include outward protrusion surfaces.

In another example as illustrated in FIG. 15, the opposite surface of the inner member 1 may include an outward protrusion surface that protrudes outside toward the outer member 2. The opposite surface 12 includes an outward protrusion surface 12a, the opposite surface 13 includes outward protrusion surfaces 13a and 13b, and the opposite surface 14 includes an outward protrusion surface 14a. At the opposite surface where the outward protrusion surface is formed, the outward protrusion surface corresponds to the second adjacent surface that is adjacent to the outer member 2. In addition, the outward protrusion surface is not formed at the opposite surface 11 of the inner member 1 that is opposed to the opposite surface 21 of the outer member 2 where the inward protrusion surfaces 21a and 21b are formed. Similarly, the inward protrusion surface is not formed at the opposite surface of the outer member 2 that is opposed to the opposite surface of the inner member 1 where the outward protrusion surface is formed.

With the above structure, the outward protrusion surfaces 12a, 13a, 13b, and 14a of the inner member 1 correspond to the second adjacent surfaces that are adjacent to the outer member 2. Thus, the contact area with the outer member 2 can be reduced and accordingly, the amount of the insulator 3 to be used can be reduced. In the case where the insulator 3 is disposed by application, the application time of the insulator 3 can be shortened. In addition, since the outward protrusion surfaces 12a, 13a, 13b, and 14a are formed in the inner member 1, the buckling strength of the inner member 1 can be improved.

Figure 16:
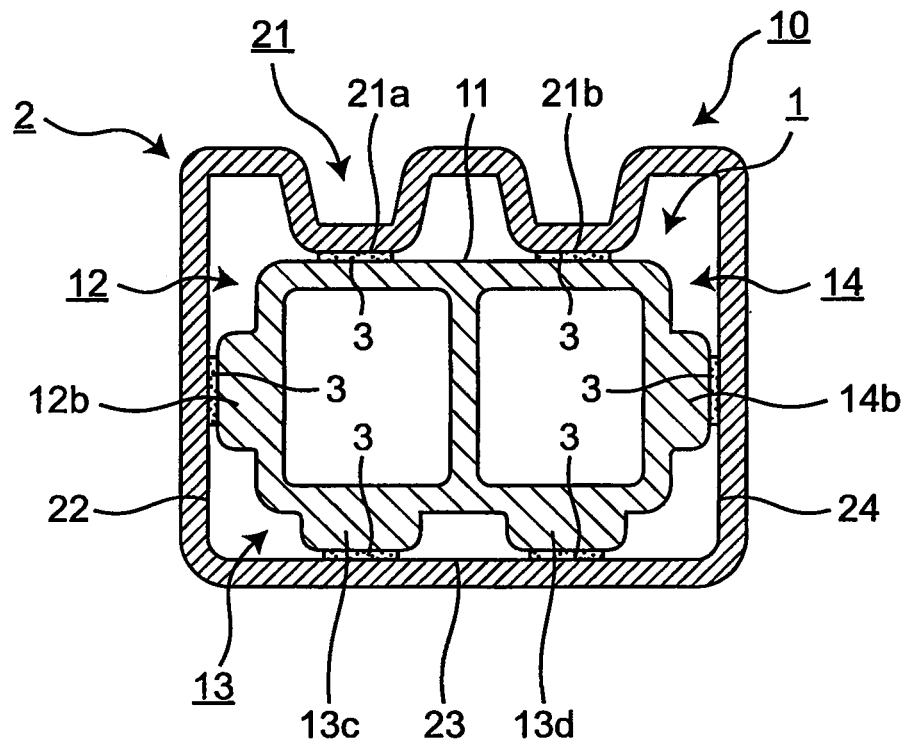
FIG. 16 is a vertical cross-sectional view illustrating a modification in which the opposite surfaces of the inner member include thick parts.

Note that, instead of providing the outward protrusion surface to the opposite surface of the inner member 1, the second adjacent surface that is adjacent to the outer member 2 may be formed by forming a thick part on the opposite surface of the inner member 1 as illustrated in FIG. 16. The opposite surface 12 includes a thick part 12b, the opposite surface 13 includes thick parts 13c and 13d, and the opposite surface 14 includes a thick part 14b. At the opposite surface where the thick part is formed, the thick part includes the second adjacent surface that is adjacent to the outer member 2.

With the above structure in which the thick parts 12b, 13c, 13d, and 14b are formed in the opposite surface of the inner member 1 as the second adjacent surfaces that are adjacent to the outer member 2 in a manner similar to the case where the outward protrusion surface is formed in the opposite surface of the inner member 1, the contact area with the outer member 2 can be reduced and as a result, the amount of the insulator 3 to be used can be reduced. In the case where the insulator 3 is disposed by application, the application time of the insulator 3 can be shortened. In addition, since the thick parts 12b, 13c, 13d, and 14b are formed in the inner member 1, the buckling strength of the inner member 1 can be improved.

In FIG. 14 to FIG. 16, in a case where the area of the adjacent portion between the inner member 1 and the outer member 2 is relatively small, that is, a part of the opposite surface of the inner member 1 and a part of the opposite surface of the outer member are in contact with each other, the insulator 3 is applied in accordance with the patterns illustrated in FIG. 4A and FIG. 4B. In FIG. 14 to FIG. 16, the insulator 3 is applied in accordance with the application pattern illustrated in FIG. 4A, that is, applied to the entire adjacent portion between the second adjacent surface of the inner member 1 and the first adjacent surface of the outer member 2.

Figure 17:
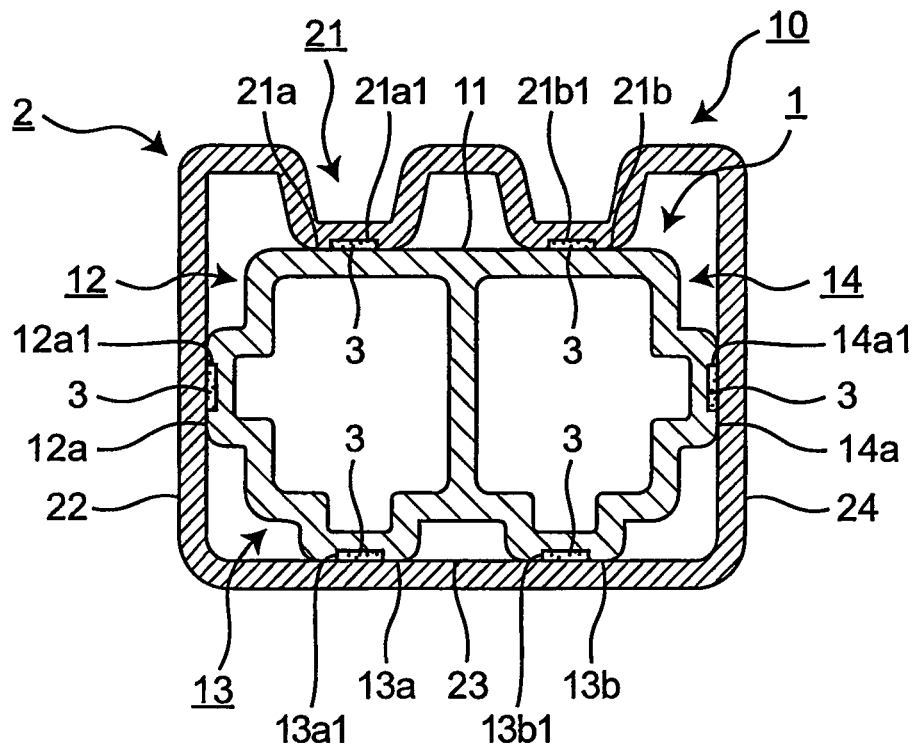
FIG. 17 is a vertical cross-sectional view illustrating a modification in which the opposite surfaces of the inner member include thick parts.

In addition, as illustrated in FIG. 17, grooves 12a1, 13a1, 13b1, and 14a1 may be formed in the outward protrusion surfaces 12a, 13a, 13b, and 14a of the inner member 1, and grooves 21a1 and 21b1 may be formed in the inward protrusion surfaces 21a and 21b of the outer member 2. In this case, the insulator 3 can be held by the grooves 12a1, 13a1, 13b1, 14a1, 21a1, and 21b1, so that the position of the insulator 3 can be stabilized. Note that only one groove may be formed in one outward protrusion surface or one inward protrusion surface, or a plurality of grooves may be formed in one outward protrusion surface or one inward protrusion surface. Note that grooves may be formed in the thick parts 12b, 13c, 13d, and 14b of the inner member 1 illustrated in FIG. 16.

Figure 18:
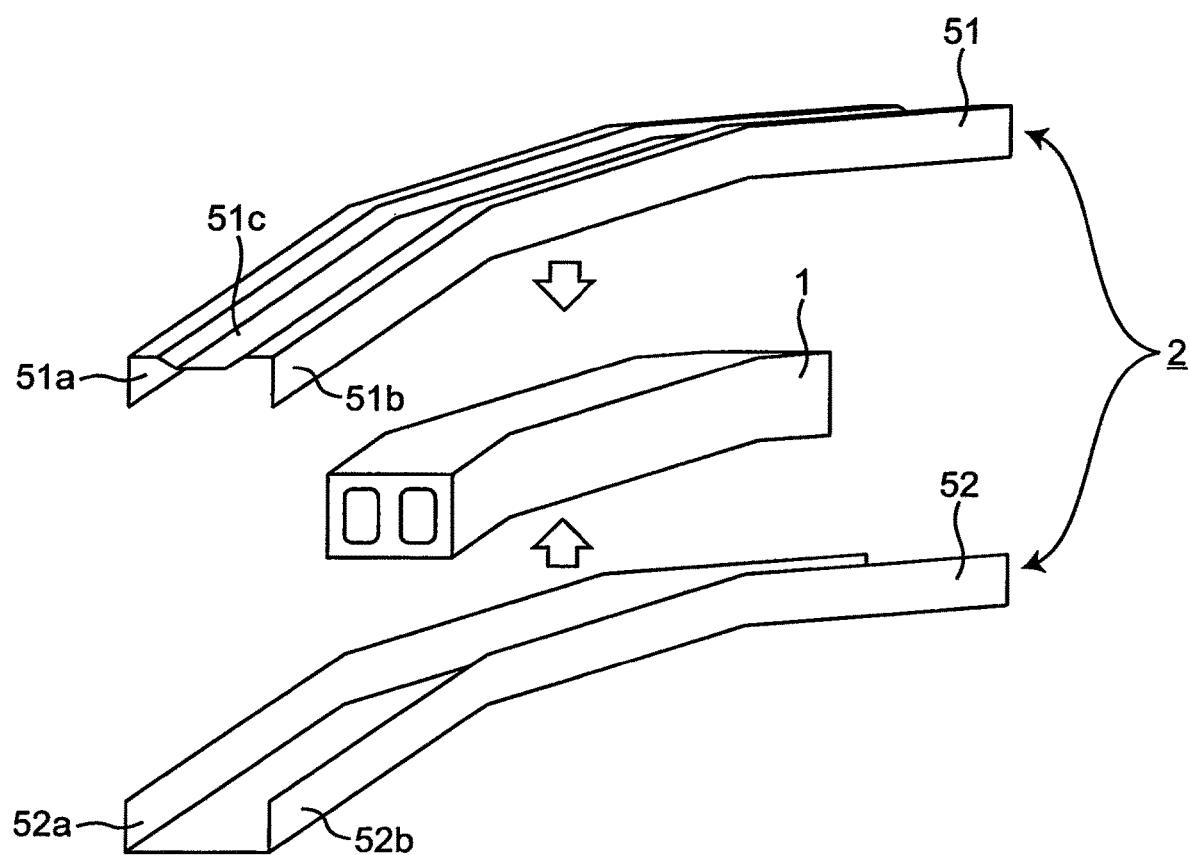
FIG. 18 is a schematic perspective view illustrating a manufacturing method in a case of manufacturing the structural member by press forming.
Figure 19A:
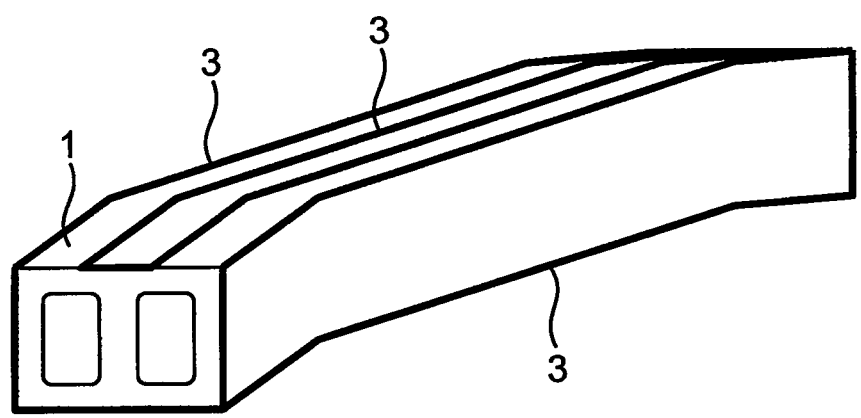
FIG. 19A is a schematic perspective view illustrating a state in which the insulator is applied to an outer surface of the inner member.
Figure 19B:
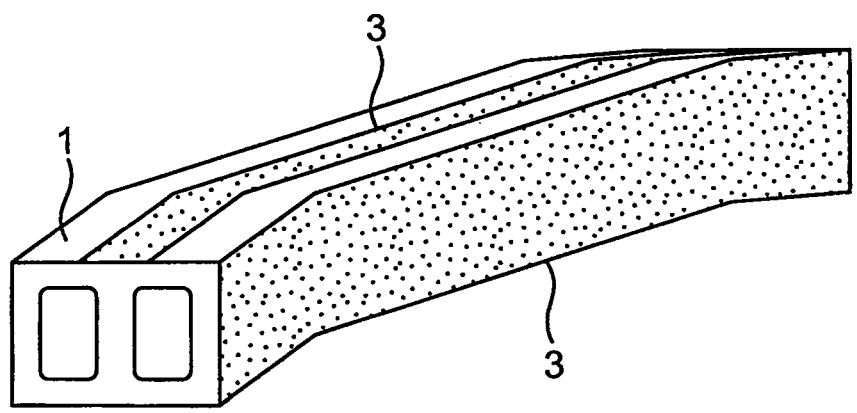
FIG. 19B is a schematic perspective view illustrating a state in which the insulator is applied to the outer surface of the inner member.
Figure 20A:
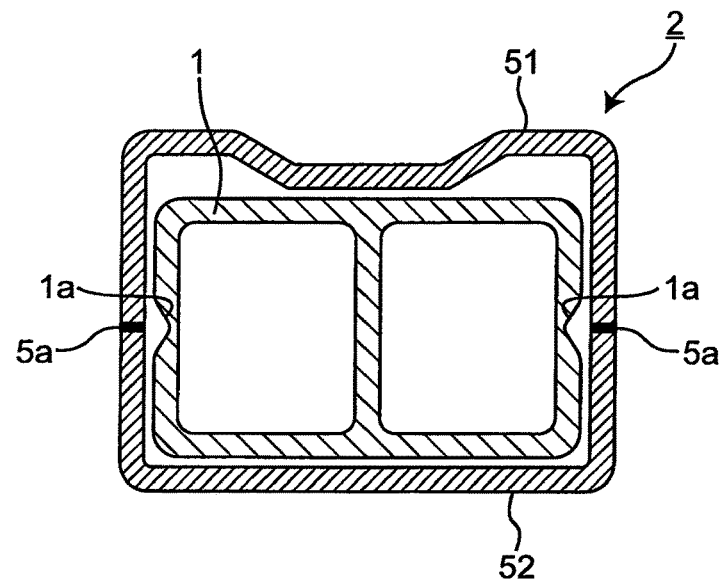
FIG. 20A is a schematic cross-sectional view of the structural member after press forming.
Figure 20B:
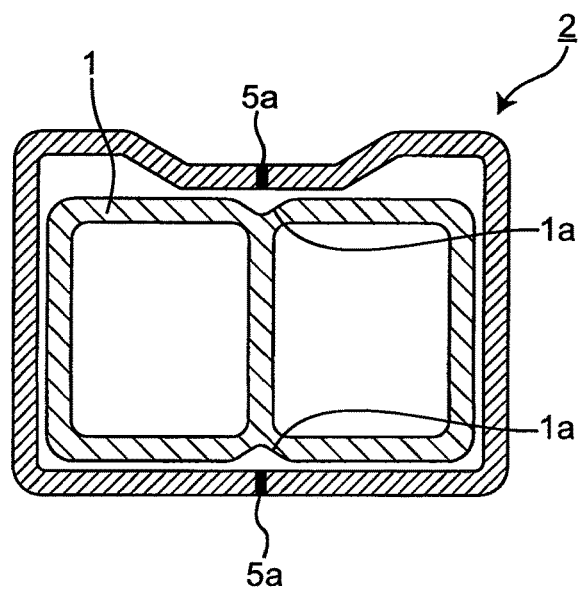
FIG. 20B is a schematic cross-sectional view of the structural member after press forming.
Figure 20C:
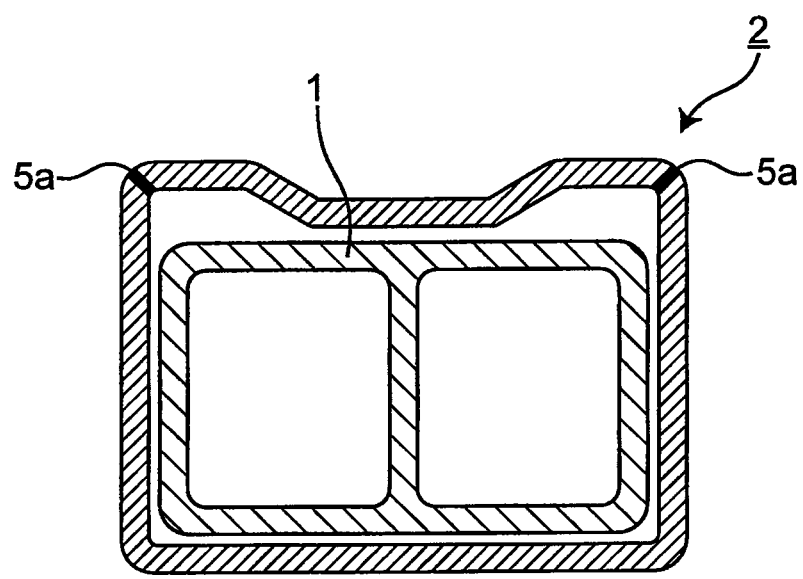
FIG. 20C is a schematic cross-sectional view of the structural member after press forming.

In the above embodiment, the structural member 10 is formed by the roll forming of the outer member 2 outside the inner member 1; however, the structural member 10 may alternatively be formed such that the inner member 1 that is processed in advance is disposed between an outer upper member 51 and an outer lower member 52 that are processed in advance and press forming is performed on the outer upper member 51 and the outer lower member 52 from above and below. The outer member 2 includes the outer upper member 51 and the outer lower member 52. FIG. 18 is a schematic perspective view illustrating a manufacturing method in a case where the structural member 10 is manufactured by press forming. FIG. 19A and FIG. 19B are schematic perspective views illustrating a state in which the insulator 3 is applied to the outer surface of the inner member 1. FIG. 20A, FIG. 20B, and FIG. 20C are schematic cross-sectional views of the structural member 10 after press forming.

A procedure of manufacturing the structural member 10 is described with reference to FIG. 18 to FIG. 20C.

First, as illustrated in FIG. 18, the outer upper member 51 and the outer lower member 52 are processed in advance as necessary. Specifically, in the outer upper member 51, width-direction end parts 51a and 51b are bent downward to have a U-like shape and a recess 51c is formed on an upper central part. In addition, in the outer lower member 52, width-direction end parts 52a and 52b are bent upward to have a U-like shape. Furthermore, the inner member 1 is also processed in advance as necessary. In regard to the processing of the inner member 1 performed in advance, for example, a recess 1a that is depressed inward is formed so as to avoid a welded part 5a between the outer upper member 51 and the outer lower member 52 as illustrated in FIG. 20A. In a case where the press forming of the outer member 2 is performed from left and right as illustrated in FIG. 20B, each welded part 5a is formed at an upper central part and a lower central part of the outer member 2, and in this case, each recess 1a that is depressed inward is formed at an upper central part and a lower central part of the inner member 1. In the case where the welded part 5a is formed at each width-direction end part of the upper part of the outer member 2 as illustrated in FIG. 20C, the width-direction end part of the upper part of the outer member 2 may be formed so as to protrude outward relative to the inner member 1 in the welded part 5a, so that the welded part 5a and the inner member 1 is separated from each other Next, the inner member 1 is disposed between the outer upper member 51 and the outer lower member 52.

Note that the insulator 3 is disposed (applied) to the second adjacent surface of the inner member 1 and/or the first adjacent surface of the outer member 2. The insulator 3 may be applied before start of the press forming of the outer member 2 or during the press forming of the outer member 2.

In the case where the insulator 3 is disposed by application between the second adjacent surface of the inner member 1 and the first adjacent surface of the outer member 2, various application patterns are considered. For example, the insulator 3 may be applied only at the periphery of the adjacent portion as illustrated in FIG. 19A. In another example, the insulator 3 may be applied to the entire adjacent portion as illustrated in FIG. 19B.

In the case where the insulator 3 is disposed by application between the second adjacent surface of the inner member 1 and the first adjacent surface of the outer member 2, as illustrated in FIG. 19A and FIG. 19B, the insulator 3 may be applied to the portion on the second adjacent surface of the inner member 1, may be applied to the portion on the first adjacent surface of the outer member 2, or may be applied to both the portion on the second adjacent surface of the inner member 1 and the portion on the first adjacent surface of the outer member 2.

Then, in a state where the inner member 1 is disposed between the outer upper member 51 and the outer lower member 52, the pressing is performed from above and below so that the outer upper member 51, the outer lower member 52, and the inner member 1 are bonded together.

At the end of the press forming, a connection part between the outer upper member 51 and the outer lower member 52 is bonded by welding so that the outer member 2 completely covers the outer surface of the inner member 1, and thus the welded part 5a is formed. Here, as described above, the inner member 1 and/or the outer member 2 is processed in advance in order to reduce the influence of the welding heat on the outer member 2, and the inner member 1 is disposed apart from the welded part 5a.

The following process is similar to that of the embodiment described above. Note that the processing of the structural member 10 may be performed in advance on only the outer upper member 51, the outer lower member 52, and the inner member 1, and after the press forming, the structural member 10 may be bent or the like.

By the manufacture of the structural member 10 through the press forming, the following effects can be obtained.

(1) By forming the structural member 10 through the press forming, the structural member 10 can be formed easily as compared to the roll forming.

(2) Even in the case where the inner member 1 extends along the entire length of the outer member 2 in the longitudinal direction as illustrated in FIG. 11, the structural member 10 can be formed easily by the press forming. In the case where the structural member 10 as illustrated in FIG. 11 is formed by the roll forming, the yield tends to be lower than that in the press forming.

(3) In the press forming, the outer upper member 51, the outer lower member 52, and the inner member 1 can be processed individually in advance; therefore, the structural member 10 with a complicated shape that is difficult to achieve by the roll forming can be formed easily.

(4) In the press forming, the outer upper member 51, the outer lower member 52, and the inner member 1 can be processed individually in advance; therefore, the outer upper member 51, the outer lower member 52 can be formed by hot pressing (hot stamp). Therefore, by the formation using the hot stamp, the complicated processing can be performed using the outer upper member 51 and the outer lower member 52.

(5) In the press forming, the outer upper member 51, the outer lower member 52, and the inner member 1 can be processed individually in advance; therefore, a positioning part used to position the inner member 1 can be formed by the processing performed in advance in the outer upper member 51 and the outer lower member 52. As a result, the inner member 1 can be easily positioned in the press forming.

In the above embodiment, the materials for the individual members are described. However, the materials for the individual members are not limited to those described above and the present invention is applicable to arbitrary materials. However, it should be noted that the inner member 1 and the outer member 2 are formed of different materials.

In the above embodiment, the structural member 10 is used for the bumper beam in the vehicle such as an automobile. However, the use of the structural member 10 is not limited to the bumper beam and the present invention is widely applicable to general structural members for securing the structural strength of the member.

The present invention is not limited to the structure described above in the embodiment, and includes various modifications that can be conceived by a person skilled in the art without departing from the concept described in the scope of claims.

The invention claimed is:

1. A structural member comprising:
an inner member extending in a longitudinal direction and having one side and the other side opposite to the one side in a cross-sectional view; and
an outer member formed of a material different from that of the inner member, the outer member extending in the longitudinal direction and being positioned outside the inner member so as to entirely surround the inner member and including a first adjacent surface adjacent to an outer surface of at least one of the one side and the other side of the inner member in the cross-sectional view;
wherein the first adjacent surface includes two inward protrusion surfaces each protruding toward a second adjacent surface of the inner member, the second adjacent surface being an external surface of at least one of the one side and the other side of the inner member adjacent to the first adjacent surface of the outer member,
wherein an insulator is disposed between each of the inward protrusion surfaces of the outer member and the second adjacent surface of the inner member, and
wherein the inner member has a middle part that extends in the longitudinal direction and connects between a first part of the one side and the other side of the inner member, the first part being a middle position between the two inward protrusion surfaces.

2. The structural member according to claim 1, wherein the insulator is disposed on an entire portion between the first adjacent surface and the second adjacent surface.

3. The structural member according to claim 1, wherein the insulator is disposed at a border part between the first adjacent surface and the second adjacent surface, and an outside.

4. The structural member according to claim 1, wherein
at least one opposite surface of the inner member that is opposed to the outer member includes one or more outward protrusion surfaces that protrude toward the outer member in a cross-sectional view, and
the outward protrusion surface corresponds to the second adjacent surface.

5. The structural member according to claim 1, wherein the inner member extends along an entire length of the outer member in the longitudinal direction.

6. The structural member according to claim 1, wherein the inner member extends by a length of a part of a length of the outer member in the longitudinal direction at an intermediate part of the outer member in the longitudinal direction.

7. The structural member according to claim 1, wherein
the outer member is formed of a steel material with a tensile strength of 1180 MPa or more, and
the inner member is formed of an aluminum alloy with a tensile strength of 340 MPa or more.

8. The structural member according to claim 1, wherein the inner member has a hollow rectangle shape in the cross-sectional view and the middle part divides the inner space of the inner member into two sub-spaces.

9. The structural member according to claim 1, wherein the inner member has at least four external side surfaces in the cross-sectional view and the outer member has corresponding inner surfaces, and at least one insulator is disposed between each of the four external side surfaces of the inner member and the corresponding inner surface of the outer member.

* * * * *